US008018839B2

(12) United States Patent
Poulin

(10) Patent No.: US 8,018,839 B2
(45) Date of Patent: Sep. 13, 2011

(54) SYNCHRONIZING PACKET SEQUENCE NUMBERS FOR LINE CARD REDUNDANCY

(75) Inventor: Andre Poulin, Gatineau (CA)

(73) Assignee: Alcatel Lucent, Paris (FR)

( * ) Notice: Subject to any disclaimer, the term of this patent is extended or adjusted under 35 U.S.C. 154(b) by 13 days.

(21) Appl. No.: 12/371,300

(22) Filed: Feb. 13, 2009

(65) Prior Publication Data

US 2010/0208582 A1  Aug. 19, 2010

(51) Int. Cl.
*H04L 1/00* (2006.01)
*H04L 12/26* (2006.01)
*H04B 7/212* (2006.01)

(52) U.S. Cl. ........ 370/219; 370/321; 370/337; 370/347; 370/442

(58) Field of Classification Search .......... 370/218–220, 370/321, 336, 337, 347, 442
See application file for complete search history.

(56) References Cited

U.S. PATENT DOCUMENTS

| | | | |
|---|---|---|---|
| 7,116,634 B1 * | 10/2006 | Hanselmann ................. | 370/219 |
| 2002/0089940 A1 * | 7/2002 | Lee .............................. | 370/282 |
| 2004/0100899 A1 * | 5/2004 | Mahamuni .................... | 370/216 |
| 2005/0265348 A1 | 12/2005 | Mochizuki | |
| 2006/0239270 A1 * | 10/2006 | Yao et al. .................... | 370/395.5 |
| 2009/0040930 A1 * | 2/2009 | Yonge et al. ................. | 370/235 |

FOREIGN PATENT DOCUMENTS

| | | |
|---|---|---|
| AU | 2003276499 A1 | 6/2004 |
| CN | 1703026 A | 11/2005 |
| EP | 1603288 A2 | 12/2005 |
| JP | 2005341282 A | 12/2005 |
| WO | 2004049609 A1 | 6/2004 |

OTHER PUBLICATIONS

Vainshtein, et al., Structure-Aware Time Division Multiplexed (TDM) Circuit Emulation Service over Packet Switched Network (CESoPSN), Network Working Group, rfc 5086, Dec. 2007.
Sklower, et al., The PPP Multilink Protocol (MP), Network Working Group, rfc 1717, Nov. 1994.
The ATM Forum Technical Committee, "Circuit Emulation Service Interoperability Specification Version 2.0" af-vtoa-0078.00 Jan. 1997, Mountain View, CA.
ITU-T 1.363.1, Series I: Integrated Services Digital Network, Overall network aspects and functions—Protocol layer requirements, B-ISDN ATM Adaptation Layer spec., Aug. 1996.
Bocci M. et al, "Network High Availability for Ethernet Services Using IP/MPLS Networks", vol. 45, No. 3, Mar. 1, 2008, pp. 90-96.

* cited by examiner

*Primary Examiner* — Ronald Abelson
(74) *Attorney, Agent, or Firm* — Kramer & Amado, P.C.

(57) ABSTRACT

Exemplary embodiments relate to a network node implementing redundant cards and configured to synchronize sequence numbers, and a related method. The network node may include a fabric configured to route packets towards a destination. Furthermore, the network node may include an active card configured to establish at least one link to a destination node, generate a sequence number for each packet to be sent, and send a messaging packet including at least one sequence number from the active card to inactive cards over a communication channel on a data path in the fabric. Finally, the network node may include an inactive card configured to receive the messaging packet including the at least one sequence number from the active card over the communication channel, extract the at least one sequence number, and synchronize operation of the inactive card to the active card using the at least one sequence number.

15 Claims, 7 Drawing Sheets

SYNCHRONIZING PACKET SEQUENCE NUMBERS FOR LINE CARD REDUNDANCY

TECHNICAL FIELD

Embodiments disclosed herein relate generally to a redundancy scheme for a telecommunications network and, more particularly, to synchronization of sequence numbers between active and inactive cards in a network node.

BACKGROUND

In many legacy telecommunications networks, transmissions between two nodes in the network are accomplished using time-division multiplexing (TDM). TDM combines multiple data streams into one signal, thereby allowing the data streams to share the physical lines in the data path without interfering with one another. More specifically, as its name suggests, TDM divides the signal into a number of segments, each constituting a fixed length of time. Because the sending node assigns data to the segments in a rotating, repeating sequence, the receiving node may reliably separate the data streams at the other end of the transmission medium.

With the rapid development of modern packet-switched networks, however, TDM has gradually fallen out of favor as a preferred technology. For example, Voice-Over-Internet Protocol (VoIP) services have replaced many TDM-based services, given VoIP's flexibility, ease of implementation, and reduction in costs. Unfortunately, transitioning to IP-based services requires a service provider to incur significant expenses in expanding its infrastructure and replacing customer premises equipment.

Given the large initial investment, many service providers have been reluctant to make the transition from TDM-based services to corresponding services in packet-switched networks. TDM pseudowires allow service providers to gradually make the transition to packet-switched networks, eliminating the need to replace TDM-based equipment and drop support of legacy services. In particular, on the ingress end of a TDM pseudowire, a node converts the TDM signals into a plurality of packets, then sends the packets across a packet-based path, or pseudowire. Upon receipt of the packets, a node on the egress end converts the packets back into TDM signals and forwards the TDM signals towards their ultimate destination.

As with any connection, reliability of a particular TDM pseudowire is often of significant importance. In these situations, a source node responsible for sending packets over a TDM pseudowire may include redundant line cards, such that an inactive card may resume packet forwarding upon failure of an active card. Current implementations, however, fail to maintain consistency between the TDM pseudowire sequence numbers associated with packets generated in the active and inactive cards. As a result, when an inactive card resumes processing upon failure of an active card, these implementations introduce a "jump" in sequence numbers. This inconsistency in sequence numbers may result in significant consequences at the destination node, including loss of packets and, in some circumstances, a restart of the pseudowire.

Similar problems occur in the use of the Multilink Point-to-Point Protocol (MLPPP), which allows a node to aggregate multiple links such that they operate as a single, higher performance link. MLPPP allows a node to pool together the resources of multiple connections and thereby increase the available bandwidth. As with TDM pseudowires, MLPPP connections also require sequence numbers for proper operation. Again, when providing redundancy in an MLPPP system, existing solutions fail to properly synchronize sequence numbers between active and inactive cards.

For the foregoing reasons and for further reasons that will be apparent to those of skill in the art upon reading and understanding this specification, there is a need for synchronization of packet sequence numbers between active and inactive line cards in a node used to send packets over a TDM pseudowire or MLPPP bundle.

SUMMARY

In light of the present need for synchronization of sequence numbers between redundant line cards in a TDM pseudowire or MLPPP node, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a network node implementing redundant cards and configured to synchronize sequence numbers and a related method. The network node may include a fabric configured to route packets towards a destination. Furthermore, the network node may include an active card configured to establish at least one link to at least one destination node, generate a sequence number for each packet to be sent, and send a messaging packet including at least one sequence number from the active card to inactive cards over a communication channel in a data path in the fabric. Finally, the network node may include an inactive card configured to receive the messaging packet including the at least one sequence number from the active card over the communication channel, extract the at least one sequence number from the messaging packet, and synchronize operation of the inactive card to the active card using the at least one sequence number.

Accordingly, various exemplary embodiments enable efficient synchronization of sequence numbers between an inactive card and an active card in a network node. More specifically, various exemplary embodiments send messaging packets containing sequence number updates from an active card to an inactive card over a communication channel in a data path in the routing or switching fabric of a network node. Using the switching or routing fabric rather than control plane allows the inactive card to closely synchronize generation of packets to the sequence numbers used in the active card, as the data plane is significantly faster than the control plane. Close synchronization of sequence numbers between the active card and inactive card minimizes delays and data loss upon occurrence of an activity switch.

BRIEF DESCRIPTION OF THE DRAWINGS

In order to better understand various exemplary embodiments, reference is made to the accompanying drawings, wherein.

DETAILED DESCRIPTION

Figure 1A:
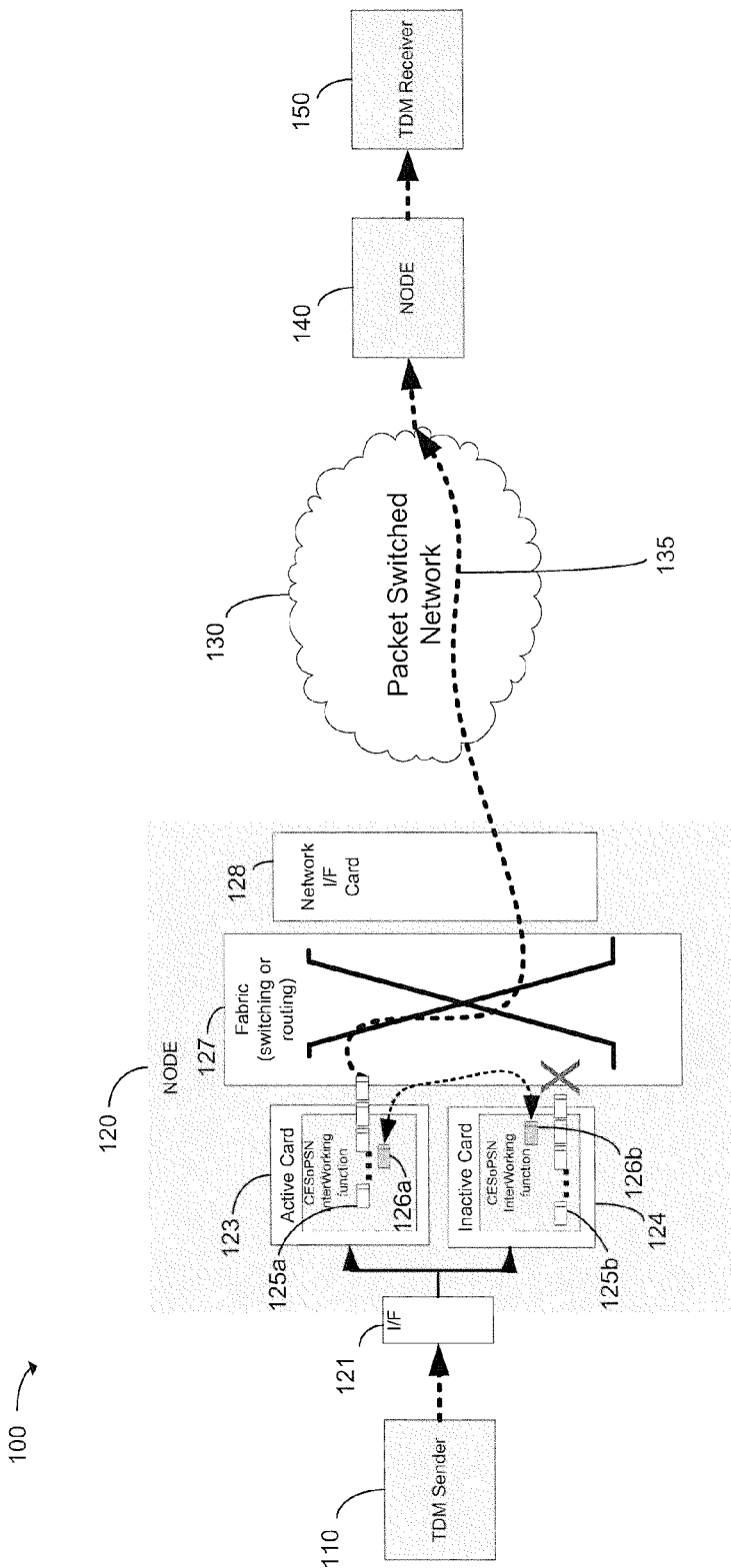
FIG. 1A is a schematic diagram of an exemplary system for emulation of TDM over a packet-switched network before an activity switch between an active card and an inactive card.

Referring now to the drawings, in which like numerals refer to like components or steps, there are disclosed broad aspects of various exemplary embodiments.

FIG. 1 is schematic diagram of an exemplary system 100 for emulation of TDM over a packet-switched network 130 before an activity switch between an active card 123 and an inactive card 124. In various exemplary embodiments, system 100 includes a TDM sender 110 and a network node 120 including interface 121, active card 123, inactive card 124, switching or routing fabric 127, and a network interface card 128. System 100 may also include a packet-switched network 130, a TDM pseudowire 135, a network node 140, and a TDM receiver 150.

TDM sender 110 may be any device suitable for generating and sending TDM signals. Thus, TDM sender 110 may be, for example, a wireless base station including a wire line interface to forward TDM data streams into node 120. For example, TDM sender 110 may be a Node B in a 3G network or another base transceiver station communicating in a Global System for Mobile Communications (GSM) network, a Universal Mobile Telecommunications System (UMTS) network, a Long Term Evolution (LTE) network, or other wireless or non-wireless network. TDM sender 110 may also be a component for implementing a Plesiochronous Digital Hierarchy (PDH), a Synchronous Digital Hierarchy (SDH), Synchronous Optical Networking (SONET), T1/E1 wirelines, or suitable replacements that will be apparent to those of skill in the art.

Node 120 may be configured to receive a TDM signal from TDM sender 110 and then convert the signal to a plurality of packets for transmission over a packet-switched network 130. Thus, node 120 may be a network element such as a router or switch including functionality to enable communication over a TDM pseudowire 135.

Node 120 may include interface 121, which receives data from, among others, TDM sender 110. More specifically, interface 121 may forward data into active card 123 and inactive card 124 for processing and forwarding to an appropriate destination.

Node 120 may also include active card 123, which receives data transmitted into interface 121. Active card 123 may establish a link with node 140, which, as illustrated, may be a TDM pseudowire 135. When TDM sender 110 sends TDM data through node 120, active card 123 receives the data stream through interface 121, performs processing to convert the TDM data stream into a plurality of packets 125a, then sends the packets 125a into fabric 127 for routing or switching to the destination node, which may be node 140.

When generating packets from a TDM data stream, active card 123 may generate a sequence number for each packet 125a. More specifically, because node 140 must reorder the packets 125a in order to reconstruct the corresponding TDM stream, active card 123 may generate a value indicating the order in which it generated the packets. This value could be, for example, an integer indicating the order in which active card 123 generated the packets, such that the integer is incremented each time active card 123 generates a new packet. Each sequence number may be included in the corresponding packet transmitted over TDM pseudowire 135.

Active card 123 may be further configured to send one or more messaging packets 126a over a communication channel in a data path in fabric 127 to inactive card 124. More specifically, packets 126a may indicate the value of one or more sequence numbers generated by active card 123 and an identifier of a corresponding pseudowire (e.g. an integer identifying TDM pseudowire 135), such that inactive card 124 may synchronize its operation to active card 123. The sending of these packets 126a may be triggered by initialization of inactive card 124, upon receipt of a request from inactive card 124, at regular intervals, or at some other time determined by active card 123.

Inactive card 124 may be configured similarly to active card 123. More specifically, inactive card 124 may receive data sent by TDM sender 110 through interface 121. In normal operation (i.e. active card 123 has not failed), inactive card 124 generates and sends packets 125b, but these packets terminate at some point before leaving node 120. Thus, these packets may terminate at fabric 127, at network interface card 128, or at any other point in node 120.

Additionally, inactive card 124 may be configured to receive messaging packets 126a from active card 123 over fabric 127. As described above, these packets may indicate the most recent sequence number(s) generated by active card 123 and an identifier of the corresponding link. Alternatively, inactive card 124 may send a packet 126b requesting an update from active card 123. Exemplary packet formats for these messages are described in further detail below with reference to FIGS. 4A-4D.

Upon receipt of a messaging packet 126a from active card 123, inactive card 124 may extract the information contained in the packet, such that inactive card 124 may synchronize its operation to active card 123. In particular, inactive card 124 may identify the link and its corresponding sequence number, then use these sequence numbers in generating packets for the link.

As an example, inactive card 124 may receive a message indicating the sequence number associated with packets sent over TDM pseudowire 135. Inactive card 124 may then generate packets based on this sequence number. For example, inactive card 124 may generate packets starting with this sequence number, at this sequence number plus one, at this sequence number minus one, or at any other value relative to the received sequence number. As another example, based on knowledge regarding the rate at which packets are generated, inactive card 124 may estimate the current value of the sequence number at active card 123 using the received sequence number, then begin generating sequence numbers at this value. This estimate will vary based on the type of link and, therefore, suitable estimates will be apparent to those of skill in the art.

As a result of this synchronization, subsequent packets generated by inactive card 123 contain sequence numbers roughly equal to the packets sent by active card 124. Accordingly, upon failure of active card 123, inactive card 124, now active, may immediately resume operations of active card 123, with little to no loss of data at node 140 or TDM receiver 150.

It should be apparent that, because the messaging packets 126a, 126b are sent over fabric 127, rather than using control plane messaging, inactive card 124 may maintain a highly accurate indication of the most recent sequence number used by active card 123. More specifically, sending packets 126a, 126b over the data plane greatly minimizes the delay associated with control plane messaging, such that the value received at inactive card 124 closely corresponds to the current sequence number used by active card 123. In particular, because packets are generated for TDM pseudowire 135 at a relatively low rate, sending a message over the data plane allows inactive card 124 to receive a relatively recent sequence number generated by active card 123. As described above, in instances where packets are generated at a higher rate, inactive card 124 may estimate the number of sequence numbers generated by active card 123 since the sequence number was generated, then add this number to the sequence number to obtain an estimated current value of the sequence number.

Using these procedure, the difference between the current sequence number in active card 123 and the most recent value of the sequence number received at inactive card 124 may be, depending on the implementation, less than or equal to 2. It should be apparent, however, that values greater than 2 may still provide the required synchronization, depending on the implementation. Inactive card 124, upon resuming operations of active card 123, may therefore immediately begin sending packets with little or no loss of data at node 140 and TDM receiver 150.

It should also be apparent that the foregoing description of active card 123 and inactive card 124 is intended to provide an overview of the functionality of these components in system 100. The internal components of an exemplary card are further described below with reference to FIG. 3.

Packet-switched network 130 may be any network operating in accordance with a packet-based protocol. Thus, network 130 may operate, for example, according to Transmission Control Protocol/Internet Protocol (TCP/IP), Multi Protocol Label Switching (MPLS), Ethernet, Provider Backbone Transport (PBT), or any other suitable packet-based protocol that will be apparent to those of skill in the art.

System 100 may also include a TDM pseudowire 135 for transmitting data between node 120 and node 140 over packet-switched network 130. More specifically, TDM pseudowire 135 may comprise a link in packet-switched network 130 for transmission of a plurality of packets that emulate a TDM signal. It should be apparent that, although illustrated as including only one TDM pseudowire 135, system 100 may include a plurality of TDM pseudowires originating at node 120 and terminating at node 140 or some other node.

Node 140 may receive, at a variable rate, packets transmitted from node 120 over TDM pseudowire 135. Node 140 may then convert the packets back into a TDM signal for transmission of the signal to TDM receiver 150.

System 100 may also include a TDM receiver 150, which receives the outputted TDM signal from node 140. Thus, TDM receiver 150 could be, for example, customer premise equipment, a node, or any other component configured to receive and/or process TDM signals.

Figure 1B:
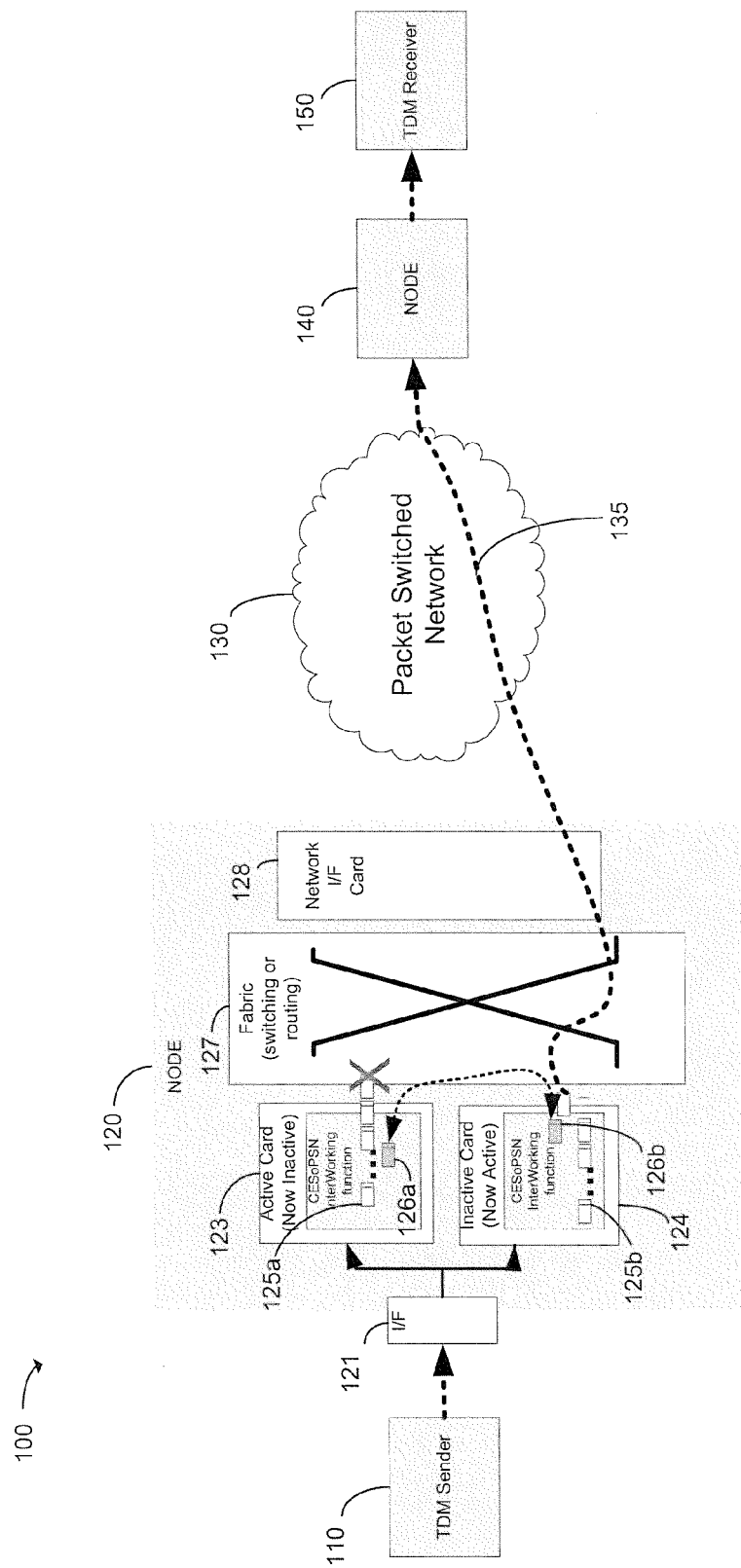
FIG. 1B is a schematic diagram of an exemplary system for emulation of TDM over a packet-switched network after an activity switch between an active card and an inactive card.

FIG. 1B is schematic diagram of an exemplary system 100 for emulation of TDM over a packet-switched network 130 after an activity switch between an active card 123, now inactive, and an inactive card 124, now active. As indicated by the path taken by pseudowire 135 in FIG. 1B, an activity switch has occurred between active card 123 and inactive card 124. This activity switch may be triggered by any of a number of circumstances, including failure and maintenance of previously active card 123.

As described in further detail above with reference to FIG. 1A, upon an activity switch, inactive card 124, now active, resumes packet forwarding operations over TDM pseudowire 135. More specifically, inactive card 124 begins forwarding packets 125b over TDM pseudowire 135 to destination node 140. Because inactive card 124 previously received an indication of a sequence number recently generated by active card 123, now inactive, inactive card 124 may generate packets 125b with a sequence number equal to or approaching the value that would have been assigned by active card 123. As a result, upon becoming active, inactive card 124 may resume data transfer on TDM pseudowire 135 at approximately the same sequence number that would have been used by active card 123 if active card 123 had stayed active. This minimizes the effect on node 140, thereby reducing data loss and reducing the possibility of a restart of pseudowire 135. In contrast, cards in known systems would send packets using an independently-determined sequence number, thereby introducing the possibility of data loss at the destination node and possibly necessitating a costly restart of the TDM pseudowire.

It should be apparent that the foregoing description of the operation of system 100 using TDM pseudowires is exemplary. Thus, in various exemplary embodiments, system 100 may be modified to operate with any system that requires sequence numbers. For example, as described in further detail below with reference to FIGS. 2A and 2B, node 120 may be modified to operate in accordance with the Multilink Point-to-Point Protocol (MLPPP).

Figure 2A:
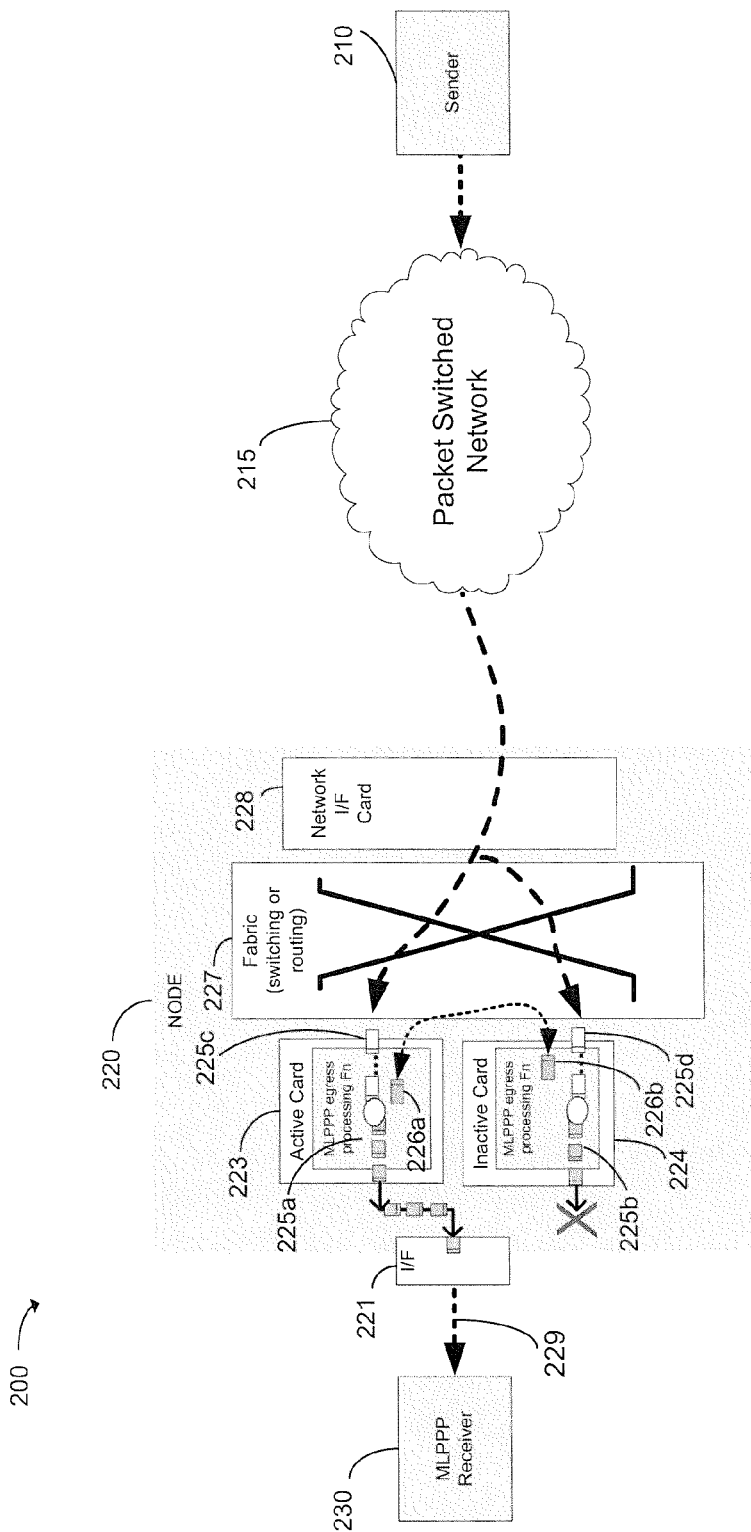
FIG. 2A is a schematic diagram of an exemplary system including a node implementing the Multilink Point-to-Point Protocol before an activity switch between an active card and an inactive card.

FIG. 2A is a schematic diagram of an exemplary system 200 including a node 220 implementing the Multilink Point-to-Point Protocol before an activity switch between an active card 223 and an inactive card 224. In various exemplary embodiments, system 200 includes sender 210, packet-switched network 215, a receiver 230, and a network node 220 including an interface 221, active card 223, inactive card 224, switching or routing fabric 227, and network interface card 228.

The following description of system 200 is intended to provide an overview of the components of such a system 200. These components may be implemented similarly to the corresponding components described in further detail above with reference to FIGS. 1A and 1B. Thus, further understanding of system 200 may be attained by applying the relevant portions of the description of FIGS. 1A and 1B to the following.

In general, sender 210 may generate packets for transmission into node 220 through packet-switched network 215. These packets may be received at node 220 and transmitted to active card 223, which receives a copy 225c of the packets, and inactive card 224, which receives a copy 225d of the packets, through network interface card 228 and fabric 227.

Active card 223 may then generate a plurality of packets 225a for transmission to receiver 230 through interface 221 over MLPPP bundle 229. Inactive card 224 may also generate a plurality of packets 225b, but these packets will terminate at some point before leaving node 220.

Active card 223 may be further configured to utilize the Multilink Point-to-Point Protocol for transmission of packets over a plurality of physical links, known as a bundle. Thus, the components of node 220 may comply with Request For Comments 1717, "The PPP Multilink Protocol," published by the Internet Engineering Task Force. In order to identify the packets such that receiver 230 may reassemble the data received over the MLPPP bundle 229, active card 223 may generate a sequence number for each packet. In particular, active card 223 may generate a sequence number indicating the order in which packets are sent over the plurality of physical links in a given bundle.

Active card 223 may generate a messaging packet 226a including a current sequence number of each MLPPP bundle 229 or MLPPP bundle class. As also described above, this may be triggered by active card 223 or upon receipt of a request packet 226b from inactive card 224. Upon receipt of the messaging packet 226a over the data plane of fabric 227, inactive card 224 may synchronize the generation of sequence numbers to active card 223, as also described in further detail above. In particular, inactive card 224 may generate packets for each MLPPP bundle 229 or MLPPP bundle class beginning with a starting sequence number determined using the sequence number received from active card 223.

Figure 2B:
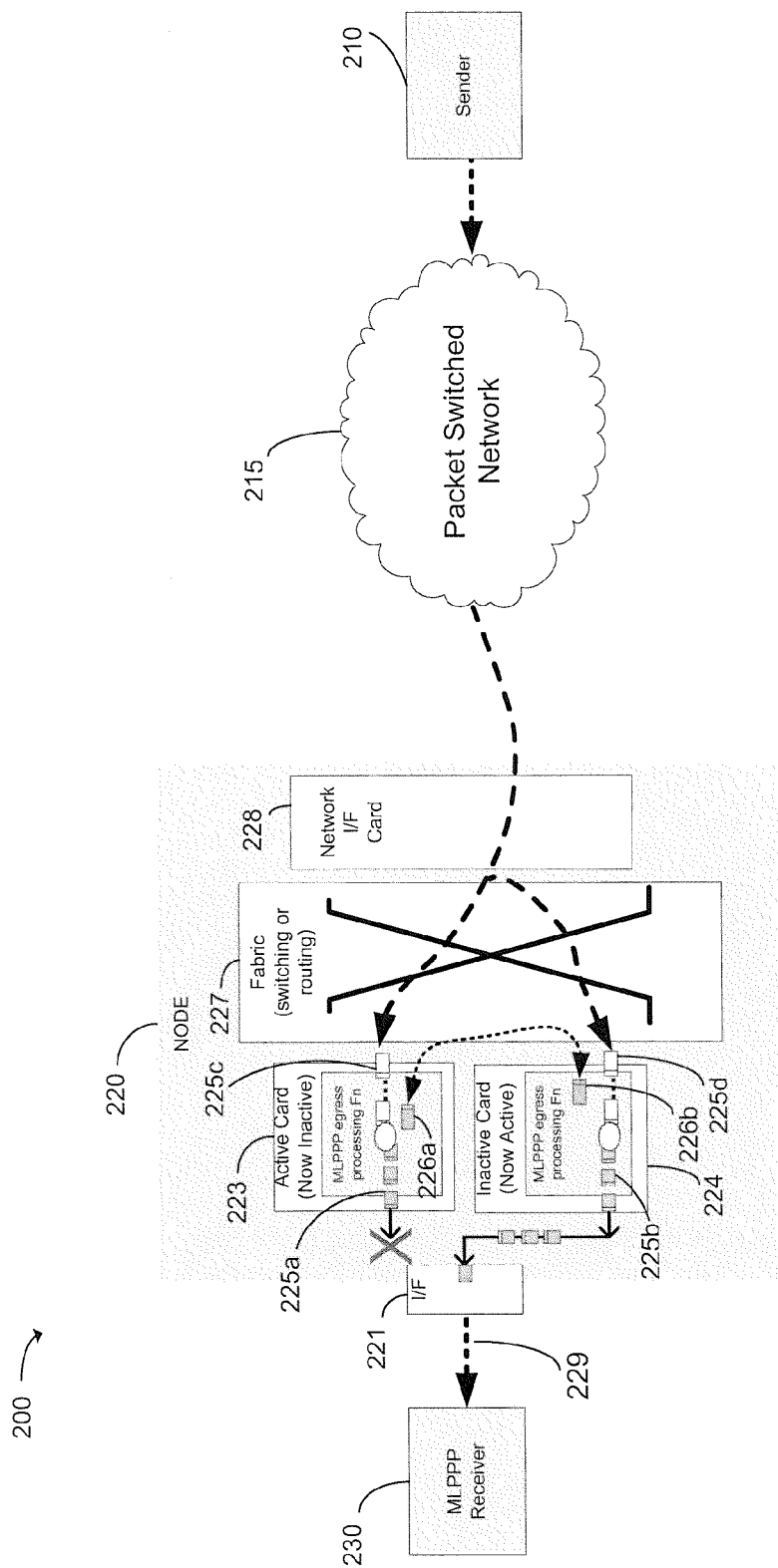
FIG. 2B is a schematic diagram of an exemplary system including a node implementing the Multilink Point-to-Point Protocol after an activity switch between an active card and an inactive card.

FIG. 2B is a schematic diagram of an exemplary system 200 including a node 220 implementing the Multilink Point-to-Point Protocol after an activity switch between an active card 223, now inactive, and an inactive card 224, now active. As indicated by the path taken by the MLPPP bundle 229 between node 220 and receiver 230, an activity switch has occurred between active card 223 and inactive card 224.

As described in further detail above with reference to FIG. 1A, upon an activity switch, inactive card 224, now active, resumes packet forwarding operations over the MLPPP bundle 229 between node 220 and receiver 230. Because inactive card 224 previously received an indication of the sequence numbers recently generated by active card 223, inactive card 224 may generate packets 225b with sequence numbers equal to or approaching the value that would have been assigned to the corresponding MLPPP bundle 229 or MLPPP bundle class by active card 223.

Figure 3:
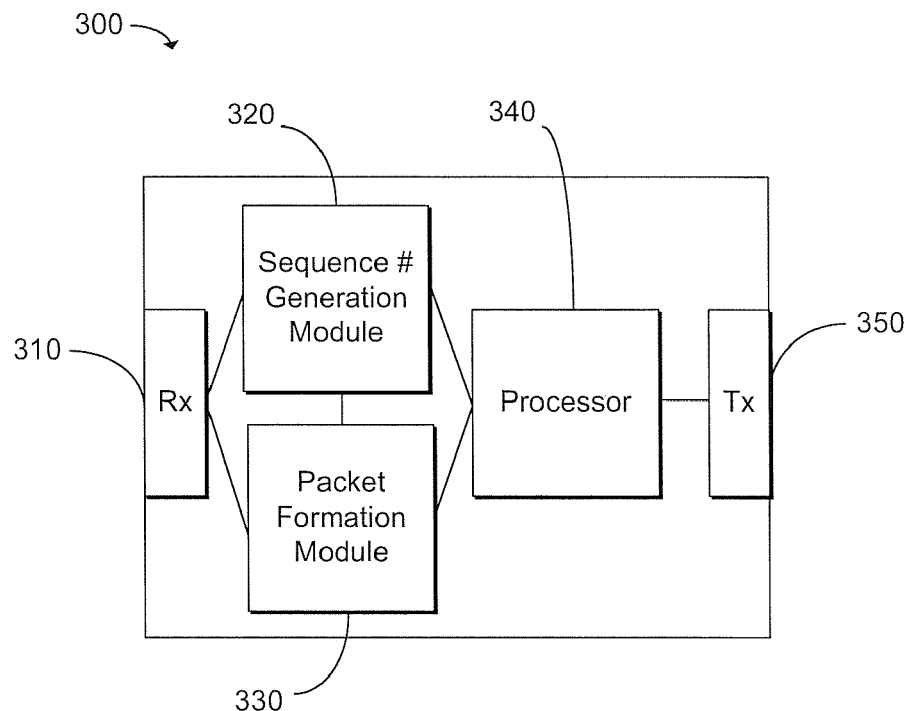
FIG. 3 is a schematic diagram of the internal components of an exemplary card for use in the node of FIGS. 1A, 1B, 2A, and 2B.

FIG. 3 is a schematic diagram of the components of an exemplary card 300 for use in system 100, 200 of FIGS. 1A, 1B, 2A, and 2B. Card 300 may operate as either active card 123, 223 or inactive card 124, 224 in system 100, 200. In various exemplary embodiments, card 300 includes a receiver 310, a sequence number generation module 320, a packet formation module 330, a processor 340, and a transmitter 350. As will be apparent from the following description, each of these components may communicate with one or more of the other components to implement the functionality of card 300.

Receiver 310 may include hardware and/or software encoded on a machine-readable storage medium configured to receive data. Thus, receiver 310 may include one or more interfaces to receive packets and other data from a hardware interface 121 or fabric 227. When card 300 is an active card 123, 223, receiver 310 may be configured to receive messaging packets 126b, 226b containing sequence number requests from an inactive card 124, 224. Conversely, when card 300 is an inactive card 124, 224, receiver 310 may be configured to receive messaging packets 126a, 226a containing sequence numbers from an active card 123, 223. It should be apparent that receiver 310 is illustrated and described as a single module for simplicity; in operation, receiver 310 may comprise a plurality of individual components in card 300.

Sequence number generation module 320 may include hardware and/or software encoded on a machine-readable storage medium configured to generate a sequence number for each packet to be sent over a communication link, such as a pseudowire or MLPPP bundle or bundle class. Each card 300 may include a sequence number generation module for each pseudowire or MLPPP bundle or bundle class. When card 300 is an active card 123, 223, sequence number generation module 320 may generate a sequence number for each packet indicating the order in which packets were generated. This number could be, for example, an integer indicating the order in which card 300 generates the packet, such that the integer is incremented each time card 300 generates a new packet. Each sequence number may be included in the corresponding packet generated by packet formation module 330.

Sequence number generation module 320 may perform similar functions when card 300 is an inactive card 124, 224. In generating sequence numbers, however, sequence number generation module 320 may begin assignment of sequence numbers at the number most recently received at receiver 310 from active card 123, 223 or a number derived therefrom, such that inactive card 124, 224 synchronizes its operation to active card 123, 223. This synchronization of sequence numbers may be performed for each pseudowire or for each MLPPP bundle or MLPPP bundle class.

Packet formation module 330 may include hardware and/or software encoded on a machine-readable storage medium configured to generate and send packets. Thus, when card 300 is used to emulate TDM data streams over a packet-switched network, packet formation module 330 may receive data from receiver 310 and a sequence number from sequence generation module 320, then use this information to generate a packet for transmission using transmitter 350.

Packet formation module 330 may also be used to generate packets used to exchange sequence numbers between an active card 123, 223 and inactive card 124, 224. Thus, when card 300 is an active card 123, 223, packet formation module 330 may generate a messaging packet including one or more sequence numbers and an identifier of the corresponding link(s). Conversely, when card 300 is an inactive card 124, 224, packet formation module 330 may generate a messaging packet including a request for updated sequence numbers from active card 123, 223. Exemplary packet formats for these messages are described in further detail below with reference to FIGS. 4A-4D.

Processor 340 may be used to perform other operations necessary to implement the functionality of card 300. Processor 340 may be a network processor, Field Programmable Gate Array (FPGA), general purpose microprocessor, machine-readable medium encoded with instructions, or any similar device. Processor 240 may perform calculations, control the operation of the other components, and perform packet processing and forwarding operations.

Transmitter 350 may include hardware and/or software encoded on a machine-readable storage medium configured to receive data. Thus, transmitter 350 may include one or more interfaces to transmit packets and other data into a switching or routing fabric 127 or interface 221.

When card 300 is an active card 123, 223, transmitter 350 may be configured to transmit messaging packets 126a, 226a containing sequence numbers to an inactive card 124, 224. Conversely, when card 300 is an inactive card 124, 224, transmitter 350 may be configured to transmit messaging packets 126b, 226b containing sequence number requests to an active card 123, 223.

FIGS. 4A-4D, described in further detail below, illustrate a number of messages used for exchange of sequence numbers and sequence number requests between active card 123, 223 and inactive card 124, 224. It should be apparent that the structure of these messages is exemplary and that the messages may be formatted with the same information in a different arrangement or, alternatively, include different fields to accomplish the same purpose.

Figure 4A:
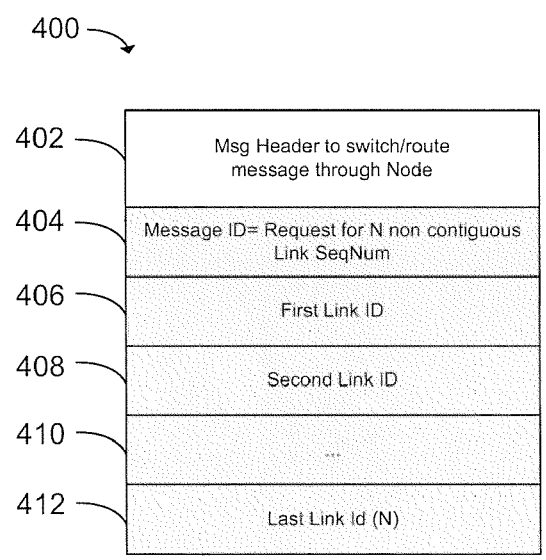
FIG. 4A is a schematic diagram of an exemplary message sent by an inactive card to an active card to request a sequence number associated with one or more identified links.

FIG. 4A is a schematic diagram of an exemplary message 400 sent by an inactive card 124, 224 to an active card 123, 223 to request a sequence number associated with one or more identified links. In various exemplary embodiments, inactive card 124, 224 sends message 400 upon initialization or at any other time at which inactive card 124, 224 requires an updated sequence number.

Message 400 may include a header 402, which includes information required to switch or route message 400 from inactive card 124, 224 to active card 123, 223. Thus, header 402 could include a destination IP address and port, or any other information sufficient for fabric 127 to switch or route message 400 to active card 123, 223. Suitable fields for inclusion in header 402 will be apparent to those of ordinary skill in the art.

Message 400 may also include a message identifier 404, which indicates the type of message sent by inactive card 124, 224. Thus, message identifier 404 could be, for example, an integer, string, or other any alphanumeric value, provided that active card 123, 223 may reliably identify the type of message. As illustrated in FIG. 4A, message ID 404 is "Request for N non-contiguous Link SeqNum," indicating that inactive card 124, 224 requires an update for a plurality of links with non-sequential identifiers. Message ID 404 could instead be "Request for Single Link SeqNum," indicating that a sequence number is required for a single link, or "Request for Bulk N Link Sequence Number," indicating that sequence numbers are required for a plurality of links with consecutive identifiers. Again, suitable variations of message ID 404 will be apparent to those of skill in the art.

Finally, message 400 may include a series of link identifiers 406, 408, 410, 412. Thus, when the request is for a plurality of links with non-sequential identifiers, message 400 may include a field with an identifier for each link for which a sequence number is required. Alternatively, message 400 may include a single field with one identifier when the sequence number is only required for one link. As another alternative, when the request is for a plurality of links with consecutive identifiers, message 400 may include two fields, one indicating the lowest identifier and another indicating the highest identifier.

Figure 4B:
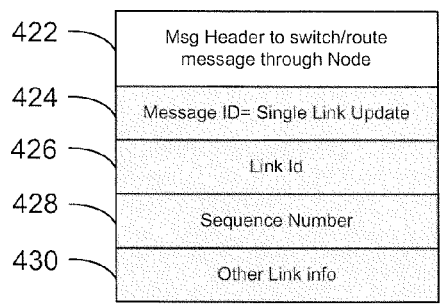
FIG. 4B is a schematic diagram of an exemplary message used to send a sequence number associated with a single link from an active line card to an inactive line card.

FIG. 4B is a schematic diagram of an exemplary message 420 used to send a sequence number associated with a single link from an active line card 123, 223 to an inactive line card 124, 224. In various exemplary embodiments, active card 123, 223 sends message 420 upon receipt of a request 400 from inactive card 124, 224, upon initialization of inactive card 124, 224, at regular intervals, or at any other time determined by active card 123, 223.

Message 420 may include a message header 422, which includes information required to switch or route message 420 from active card 123, 223 to inactive card 124, 224. Thus, header 422 could include a destination IP address and port, or any other information sufficient for fabric 127 to switch or route message 420 to inactive card 124, 224.

Message 420 may also include a message identifier 424, which indicates that message 420 relates to an update of a single link. Identifier 424 may be an integer, string, or any other alphanumeric value, provided that inactive card 124, 224 may reliably identify the message as including an update of the sequence number associated with a single link.

Finally, message 420 may include three fields containing information regarding a link managed by active card 123, 223. In particular, message 420 may include link identifier field 426, which may contain an alphanumeric value that uniquely identifies a link, such as a TDM pseudowire or a MLPPP bundle or MLPPP bundle class. Message 420 may also include a sequence number field 428, which may contain the most recent sequence number generated by active card 123, 223 for the identified link. Finally, message 420 may include a link information field 430, which may contain any other relevant information regarding the link. Suitable information for inclusion in link information field 430 will be apparent to those of ordinary skill in the art.

Figure 4C:
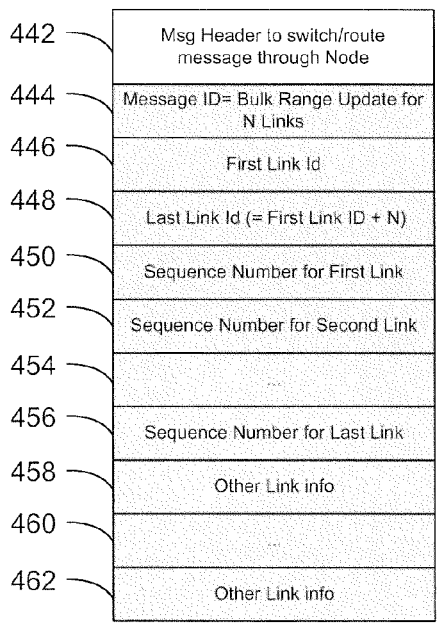
FIG. 4C is a schematic diagram of an exemplary message used to send a sequence number associated with multiple links from an active line card to an inactive line card.

FIG. 4C is a schematic diagram of an exemplary message 440 used to send a sequence number associated with multiple contiguous links from an active line card 123, 223 to an inactive line card 124, 224. In various exemplary embodiments, active card 123, 223 sends message 440 upon receipt of a request 400 from inactive card 124, 224, upon initialization of inactive card 124, 224, at regular intervals, or at any other time determined by active card 123, 223.

As with message 420, message 440 may include a message header 442, which includes information required to switch or route message 440 from active card 123, 223 to inactive card 124, 224. Thus, header 442 could include a destination IP address and port, or any other information sufficient for fabric 127 to switch or route message 440 to inactive card 124, 224.

Message 440 may also include a message identifier 444, which indicates that message 440 relates to a bulk range update for a plurality of links. Identifier 444 may be an integer, string, or any other alphanumeric value, provided that inactive card 124, 224 may reliably identify the message as including an update of sequence numbers associated with a plurality of links with consecutive identifiers.

Finally, message 440 may include a plurality of fields containing information regarding links managed by active card 123, 223. Thus, link identifier fields 446, 448 may indicate the first and last link identifiers, respectively, of links for which a sequence number update is included. Sequence number fields 450, 452, 454, 456 may contain the most recent sequence number generated by active card 123, 223 for the first, second, Nth, and last links, respectively. Finally, link information fields 456, 458, 460, 462 may contain other information for the first, second, Nth, and last links, respectively.

Figure 4D:
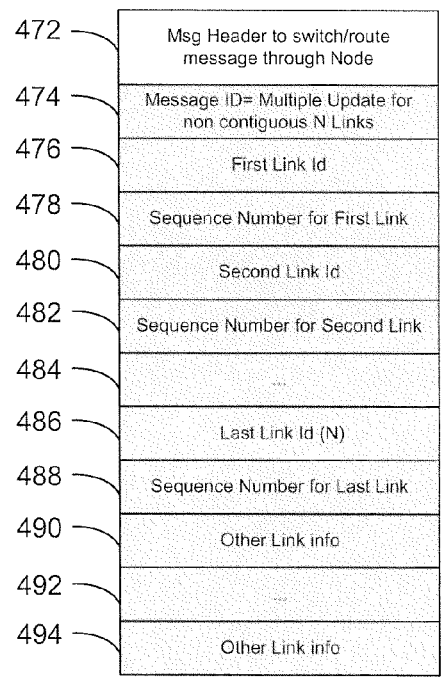
FIG. 4D is a schematic diagram of an exemplary message used to send sequence numbers associated with multiple contiguous links from an active line card to an inactive line card.

FIG. 4D is a schematic diagram of an exemplary message 470 used to send sequence numbers associated with multiple links from an active line card 123, 223 to an inactive line card 124, 224. In various exemplary embodiments, active card 123, 223 sends message 470 upon receipt of a request 400 from inactive card 124, 224, upon initialization of inactive card 124, 224, at regular intervals, or at any other time determined by active card 123, 223.

As with messages 420, 440, message 470 may include a message header 472, which includes information required to switch or route message 470 from active card 123, 223 to inactive card 124, 224. Thus, header 472 could include a destination IP address and port, or any other information sufficient for fabric 127 to switch or route message 470 to inactive card 124, 224.

Message 470 may also include a message identifier 474, which indicates that message 470 relates to an update for N non-contiguous links. Identifier 474 may be an integer, string, or any other alphanumeric value, provided that inactive card 124, 224 may reliably identify the message as including an update of sequence numbers associated with a plurality of links with non-consecutive identifiers.

Finally, message 470 may include a plurality of fields containing information regarding links managed by active card 123, 223. Thus, link identifier fields 476, 480, 486 may indicate the first, second, and last link identifiers, respectively, of links for which a sequence number update is included. Sequence number fields 478, 482, 488 may contain the most recent sequence number generated by active card 123, 223 for the first, second, and last links, respectively. As indicated by field 484, message 470 may include a plurality of other pairs of link identifiers and corresponding sequence numbers. Finally, link information fields 490, 492, 494 may contain other information for each of the links.

Figure 5:
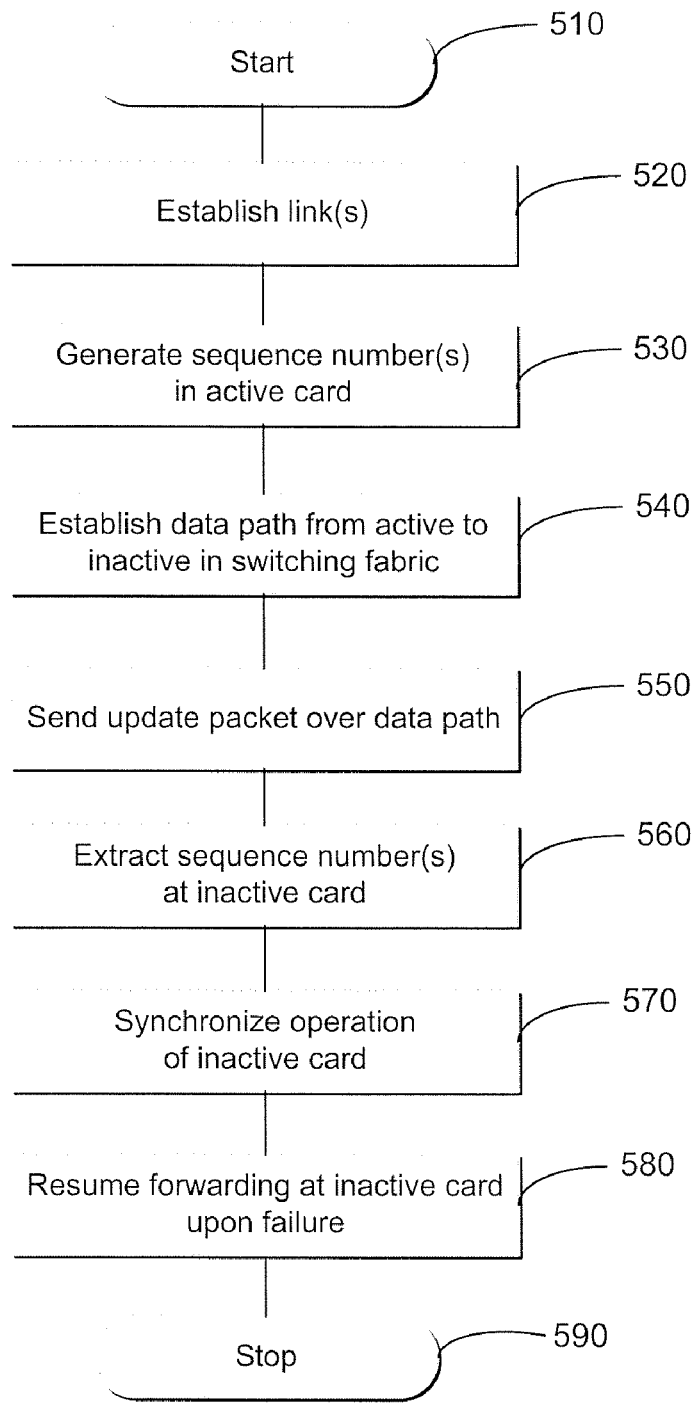
FIG. 5 is a flowchart of an exemplary method for synchronizing sequence numbers between an inactive card and an active card in a network node.

FIG. 5 is a flowchart of an exemplary method 500 for synchronizing sequence numbers between an active card 123, 223 and an inactive card 124, 224 in a network node 120. Exemplary method 500 starts in step 510 and proceeds to step 520, where at least one link is established between network node 120, 220 and a destination node, such as node 140 or receiver 230. The link(s) may be, for example, one or more TDM pseudowires or physical links in an MLPPP bundle.

After establishing a link in step 520, exemplary method 500 proceeds to step 530, where active card 123, 223 generates a sequence number for each packet to be sent by network node 120, 220 over the link(s) established in step 420. This sequence number may be, for example, an integer value that is incremented for each packet sent by node 120, 220 over a given link.

Exemplary method 500 then proceeds to step 540, where a communication channel on the data path is established between active card 123, 223 and inactive card 124, 224 through fabric 127, 227. As described in further detail above, the communication channel on the data path allows active card 123, 223 and inactive card 124, 224 to exchange information without the need for use of control plane messaging, which is significantly slower and consumes a greater amount of resources.

Exemplary method 500 then proceeds to step 550, where active card 123, 223 sends a packet across the communication channel on the data path established in step 540, the packet including the most recent sequence number generated for one or more links. As detailed above, this packet may be sent upon receipt of a request from inactive card 124, 224, upon initialization of inactive card 124, 224, at regular intervals, or at any other time determined by active card 123, 223. Each of these packets may be in one of the formats described in FIG. 4B, 4C, or 4D, or some variation thereof.

As described in further detail above, the packet sent from active card 123, 223 to inactive card 124, 224 may include the value of a sequence number and a value identifying the link corresponding to the sequence number. Furthermore, the packet may include information regarding multiple links (e.g. a plurality of TDM pseudowires or a plurality of links in one or more MLPPP bundles) between network node 120, 220 and one or more destination nodes. In these situations, active card 123, 223 may send a separate packet for each of the plurality of links using the format described in FIG. 4B, for example. Alternatively, active card 123, 223 may send a single packet including information for each of the plurality of links using the format described in either FIG. 4C or FIG. 4D, or some variation thereof.

Exemplary method 500 then proceeds to step 560, where inactive card 124, 224 extracts the sequence number(s) from the packet sent by active card 123, 223. More specifically, inactive card 124, 224 may parse the packet to determine the type of message and what fields are expected in the message. Inactive card 124, 224 may then extract the link identifiers, corresponding sequence numbers, and other information contained in the packet.

After extracting the sequence number(s) from the packet, exemplary method 500 proceeds to step 570, where inactive card 124, 224 synchronizes its operation to active card 123, 223. More specifically, for each link, inactive card 124, 224 may assign sequence numbers to packets beginning with a value determined based on the received sequence number, such that subsequent packets generated by inactive card 124, 224 contain sequence numbers roughly equal to the packets sent by active card 123, 223. As described in detail above, the starting value may be determined or estimated based on the rate at which packets are generated in active card 123, 223.

Exemplary method 500 then proceeds to step 580, where, upon failure of active card 123, 223, inactive card 124, 224 resumes the operations of active card 123, 223. More specifically, the packets generated in step 570 may be sent over fabric 127 or interface 221 and switched or routed to the appropriate destination. It should be apparent that, because inactive card 124, 224 generates packets using the sequence number update received from active card 123, 223, inactive card 124, 224 may immediately resume operations of active card 123, 223, with little to no loss of data at the destination node.

Exemplary method 500 then proceeds to step 590, where exemplary method 500 stops. It should be apparent that method 500 is described as comprising a plurality of sequential steps for the purpose of ease of explanation. Thus, in implementing method 500, one or more of these steps may be performed by different elements in parallel or may be performed in a different order.

According to the foregoing, various exemplary embodiments enable efficient synchronization of sequence numbers between an inactive card and an active card in a network node. More specifically, various exemplary embodiments send messaging packets containing sequence number updates from an active card to an inactive card over a communication channel on a data path in the routing or switching fabric of a network node. Using the switching or routing fabric rather than control plane allows the inactive card to closely synchronize generation of packets to the sequence numbers used in the active card and minimize delays and data loss upon occurrence of an activity switch.

It should be apparent from the foregoing description that various exemplary embodiments of the invention may be implemented in hardware, firmware, and/or software. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a computer, network node, router, switch, or similar device. Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A method for synchronizing sequence numbers between an inactive card and an active card in a network node, the method comprising:
   establishing at least one Time Division Multiplexing (TDM) pseudowire link between the network node and at least one destination node;
   generating at least one sequence number in the active card, wherein the active card generates a sequence number for each packet to be sent by the network node over the at least one Time Division Multiplexing (TDM) pseudowire link;
   establishing a communication channel on a data path between the inactive card and the active card through a fabric of the network node;
   sending a packet for each Time Division Multiplexing (TDM) pseudowire link including the at least one sequence number from the active card to the inactive card over the communication channel on the data path;
   extracting the at least one sequence number from the packet at the inactive card; and
   synchronizing operation upon reception of a sequence number update message, of the inactive card to the active card using the at least one sequence number extracted from the packet, wherein the packet includes at least a most recent sequence number sent by the active card;
   wherein the packet sent from the active card to the inactive card includes a value of the at least one sequence number and a value identifying the at least one Time Division Multiplexing (TDM) pseudowire link corresponding to the at least one sequence number.

2. The method for synchronizing sequence numbers according to claim 1, further comprising:
   resuming operations of the active card upon failure by sending packets to the at least one destination node using the inactive card, wherein the packets include sequence numbers generated based on the at least one sequence number received from the active card.

3. The method for synchronizing sequence numbers according to claim 1, wherein the at least one Time Division Multiplexing (TDM) pseudowire link is a plurality of Time Division Multiplexing (TDM) pseudowire links between the network node and a corresponding plurality of destination nodes.

4. The method for synchronizing sequence numbers according to claim 3, wherein the active card sends a separate packet to the inactive card for each of the plurality of Time Division Multiplexing (TDM) pseudowire links.

5. The method for synchronizing sequence numbers according to claim 3, wherein the active card sends a single packet to the inactive card, the single packet including at least one sequence number for each of the plurality of Time Division Multiplexing (TDM) pseudowire links.

6. The method for synchronizing sequence numbers according to claim 1, wherein the active card sends the packet including the at least one sequence number to the inactive card at regular intervals.

7. The method for synchronizing sequence numbers according to claim 1, wherein the active card sends the packet including the at least one sequence number to the inactive card upon initialization of the inactive card.

8. A network node implementing redundant cards and configured to synchronize sequence numbers, the node comprising:
   a fabric configured to route packets towards a destination;
   an active card configured to:
      establish at least one Time Division Multiplexing (TDM) pseudowire link between the network node and at least one destination node,
      generate at least one sequence number, wherein the active card generates a sequence number for each packet to be sent by the network node over the at least one Time Division Multiplexing (TDM) pseudowire, link, and
      send a packet for each Time Division Multiplexing (TDM) pseudowire link including the at least one sequence number from the active card to inactive cards over a communication channel on a data path in the fabric; and an inactive card operatively coupled to the fabric and the active card, the inactive card configured to:
      receive the packet from the active card over the communication channel on the data path in the fabric,
      extract the at least one sequence number from the packet, and synchronize operation upon reception of a sequence number update message of the inactive card to the active card using the at least one sequence number extracted from the packet, wherein the packet includes at least a most recent sequence number sent by the active card;
   wherein the packet sent from the active card to the inactive card includes a value of the at least one sequence number and a value identifying the Time Division Multiplexing (TDM) pseudowire link corresponding to the at least one sequence number.

9. The network node according to claim 8, wherein the inactive card is further configured to:
   resume operations of the active card upon failure by sending packets to the at least one destination node, wherein the packets include sequence numbers generated based on the at least one sequence number received from the active card.

10. The network node according to claim 8, wherein the at least one Time Division Multiplexing (TDM) pseudowire link is a plurality of Time Division Multiplexing (TDM) pseudowire links between the network node and a corresponding plurality of destination nodes.

11. The network node according to claim 10, wherein the active card sends a separate packet to the inactive card for each of the plurality of Time Division Multiplexing (TDM) pseudowire links.

12. The network node according to claim 10, wherein the active card sends a single packet to the inactive card, the single packet including at least one sequence number for each of the plurality of Time Division Multiplexing (TDM) pseudowire links.

13. The network node according to claim 8, wherein the active card sends the packet including the at least one sequence number to the inactive card at regular intervals.

14. The network node according to claim 8, wherein the active card sends the packet including the at least one sequence number to the inactive card upon initialization of the inactive card.

15. An active card for use in a network node and communicating with an inactive card in the network node to provide sequence number synchronization, the active card comprising:

a sequence number generation module configured to generate at least one sequence number, wherein the sequence number generation module generates a sequence number for each packet to be sent by the network node over at least one link; and a communication module configured to:

establish a Time Division Multiplexing (TDM) pseudowire communication channel on a data path to the inactive card through a fabric of the network node, and send a packet for each Time Division Multiplexing (TDM) pseudowire link including the at least one sequence number to the inactive card over the Time Division Multiplexing (TDM) pseudowire communication channel on the data path, whereby the inactive card synchronizes operation upon reception of a sequence number update message of the inactive card to the active card by extracting the at least one sequence number from the packet, wherein the packet includes at least a most recent sequence number sent by the active card;

wherein the packet sent to the inactive card includes a value of the at least one sequence number and a value identifying the link corresponding to the at least one sequence number.

* * * * *